United States Patent
Yamada et al.

[19]

[11] Patent Number: 5,814,368
[45] Date of Patent: Sep. 29, 1998

[54] METHOD OF SPREADING PARTICLES AND SPREADING APPARATUS

[75] Inventors: Yuka Yamada, Himeji; Ikuo Hiruta, Hyogo-ken, both of Japan

[73] Assignee: Kabushiki Kaisha Toshiba, Kawasaki, Japan

[21] Appl. No.: 806,637

[22] Filed: Feb. 26, 1997

[30] Foreign Application Priority Data

Feb. 26, 1996 [JP] Japan .................................. 8-038117

[51] Int. Cl.$^6$ ................................ B05D 1/12; B05D 5/00
[52] U.S. Cl. ........................ 427/180; 427/168; 427/286; 427/424; 427/480; 118/308; 118/323
[58] Field of Search .................................. 427/466, 467, 427/475, 477, 480, 180, 168, 197, 286, 256, 421, 424, 474, 299; 118/624, 308, 323

[56] References Cited

U.S. PATENT DOCUMENTS

| | | | |
|---|---|---|---|
| 3,932,682 | 1/1976 | Loft et al. ................................ | 428/296 |
| 5,110,632 | 5/1992 | Kawaguchi et al. ..................... | 427/424 |
| 5,460,653 | 10/1995 | Otani et al. .............................. | 118/668 |
| 5,513,026 | 4/1996 | Suzuki et al. ............................. | 359/81 |
| 5,588,996 | 12/1996 | Costello ................................... | 118/668 |
| 5,614,254 | 3/1997 | Murata et al. ........................... | 427/180 |
| 5,686,978 | 11/1997 | Oh ............................................ | 349/93 |

FOREIGN PATENT DOCUMENTS 6-3679  1/1994  Japan .

*Primary Examiner*—Shrive Beck
*Assistant Examiner*—Michael Barr
*Attorney, Agent, or Firm*—Cushman Darby & Cushman IP Group of Pillsbury Madison & Sutro LLP

[57] ABSTRACT

The present invention is a method for spreading spacing particles on a surface of a substrate used to form a liquid crystal display panel. The method comprises the steps of relatively moving the substrate and a spreading nozzle with respect to one another as the spreading nozzle spread the spacing particles such that the spacing particles spread from the spreading nozzle trace a predetermined trace on the surface of the substrate. Electric charge on the substrate is discharged while relatively moving the substrate and the spreading nozzle such that the spreading nozzle spreads the spacing particles on a discharged portion of the surface of the substrate.

8 Claims, 3 Drawing Sheets

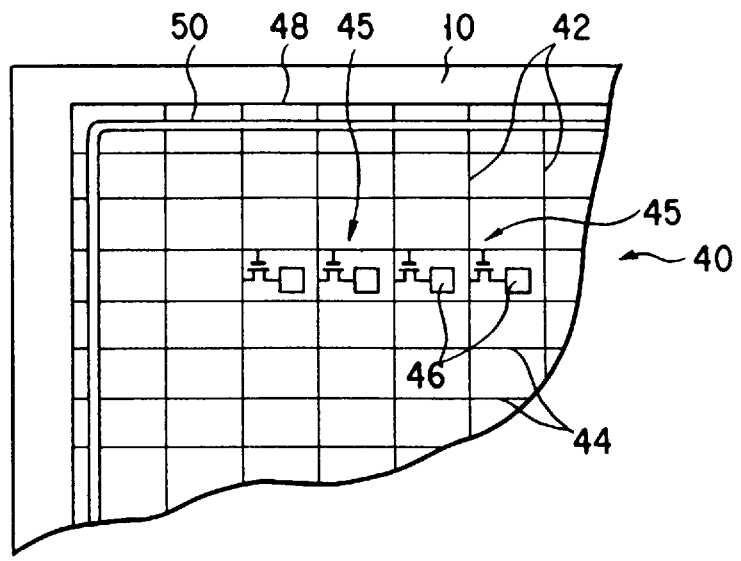
F I G. 5
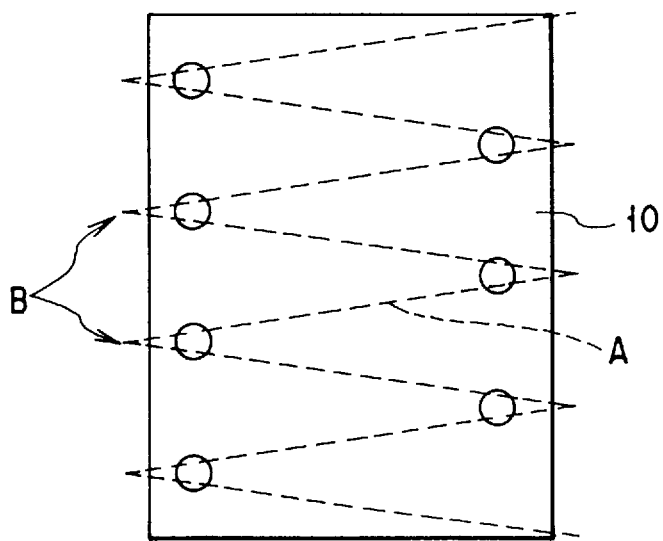
F I G. 6

METHOD OF SPREADING PARTICLES AND SPREADING APPARATUS

BACKGROUND OF THE INVENTION

The present invention relates to a method of spreading particles between two substrates of a liquid crystal display panel such that the particles serve as spacers for controlling the distance between the substrates.

In recent years, demands have arisen for a liquid crystal display panel with high performance qualities such as high contrast, a wide view angle, etc., and with high display enough quality to create a uniform display image over the entire display element without defects.

In general, a liquid crystal display panel is constructed in a manner in which two substrates are arranged so as to face each other and liquid crystal is enclosed between these substrates. It is essential to both high performance and high display quality to maintain a uniform distance between the two opposite substrates. Specifically, it is necessary to maintain the distance between the substrates at a predetermined value in order to achieve high performance of the liquid crystal display element. It is also necessary to keep the distance between the substrates uniform over the entire areas of the substrates in order to further achieve high display quality.

Hence, in order to obtain a uniform substrate distance over the entire areas of the substrates, a method has been adopted in which spacers consisting of particles each having a desired diameter are uniformly spread on the surface of one of the substrates and the other substrate is thereafter adhered thereon.

For example, Japanese Patent Application KOKAI Publication No. 6-3679 discloses an apparatus for spreading spacers comprising a swingable spreading nozzle for spreading spacers and a movement mechanism for relatively moving the spreading nozzle and a substrate in the X- and Y-directions in a horizontal plane. In this apparatus, spacers are spread onto the substrate from the nozzle while relatively moving the spreading nozzle and the substrate such that an extended line of the center axis of the spreading nozzle draws a saw-tooth-like zigzag trace on the substrate.

However, according to such a conventional spreading apparatus and a method thereof as described above, the distance between parts of the trace is smaller at each folded portion so that the spread areas of particles on the substrate are overlapped at the folded portions of the trace. In these overlapped areas, the amount of the spacers thus supplied is larger and the spread density is higher than in the other areas. For example, in case where spacers each having a diameter of about 5 $\mu$m is spread at a spread density of about 150 particles/mm$^2$, the spread density is increased to 150 to 170 particles/mm$^2$ in the overlapped areas. Therefore, the spread density of the spacers on the substrate is not uniform so that it is difficult to maintain a uniform distance between two substrates.

Note that the trace of spread particles means the trace of movement of the center of distribution of spread particles, i.e., the trace of a cross point between an extended line of the center axis of the spreading nozzle for spreading particles and the surface of the substrate.

In order to prevent the spread density from being not uniform, the swing angle of the spreading nozzle may be increased so as to make folded portions of the trace be positioned outside the substrate. However, the amount of spacers used will then be increased and the time required for spreading will be elongated.

Furthermore, in a method of spreading spacers through a spreading nozzle, the spacers are electrically charged by friction caused as the spacers transferred through a convey path with positive or negative electric charges. This kind of charging of the spacers may be preferable in view of preventing the spacers from being coagulated. If the spacers thus electrically charged are spread onto the substrate, a number of lines such as scanning lines, signal lines, and a short ring formed on the substrate are also electrically charged to a potential equal to the spacers.

However, since complicated electronic circuits are provided on the substrate of a liquid crystal panel, the substrate is not uniformly charged over its entire region, but only several particular lines or the likes are charged. In particular, when spacers are spread while moving the spreading nozzle so as to draw a certain trace, particular lines or the like on that region of the substrate where spacers are not yet spread are charged to a potential equal to the potential of the spacers, and those lines or the like repulses spacers which are spread later on that region. Therefore, the spread density of the spacers on such a region of the substrate is decreased abnormally so that non-uniformity occurs.

In addition, electric charges are gradually applied to the lines and the like of the substrate as spacers are gradually spread on the substrate. Thus, charging of the substrate leads to occurrence of defects such as electrostatic breakdown or the like of the electronic circuit and is therefore not desirable.

BRIEF SUMMARY OF THE INVENTION

The present invention has been made in view of the above circumstances, and its object is to provide a method of spreading particles capable of uniformly spreading particles serving as spacers onto a substrate.

In order to achieve the above object, a method is provided for spreading spacing particles on a surface of a substrate used to form a liquid crystal display. The method comprises the steps of relatively moving the substrate and a spreading nozzle adapted to spread the spacing particles on the substrate with respect to one another as the spreading nozzle spreads the spacing particles such that the spacing particles spread from the spreading nozzle (draw a zigzag) to form a predetermined trace on the surface of the substrate. Electric charges on the substrate are discharged while relatively moving the substrate and the spreading nozzle such that the spreading nozzle spreads the spacing particles on a discharged portion of the surface of the substrate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1 to 3 show a spreading apparatus according to an embodiment of the present invention, in which:

FIG. 1 is a schematic view showing the entire spreading apparatus,

FIG. 2 is a perspective view showing a movable table, a discharging bar, and a spreading nozzle of the apparatus, and FIG. 3 is a side view showing a positional relationship between the discharging bar and the spreading nozzle;

FIG. 5 is an enlarged plan view showing a part of conductive pattern formed on the glass substrate; and FIG. 6 is a plan view schematically showing a trace of the spreading nozzle in relation to a substrate.

DETAILED DESCRIPTION OF THE INVENTION

In the following, an embodiment of the present invention will be specifically explained.

Figure 1:
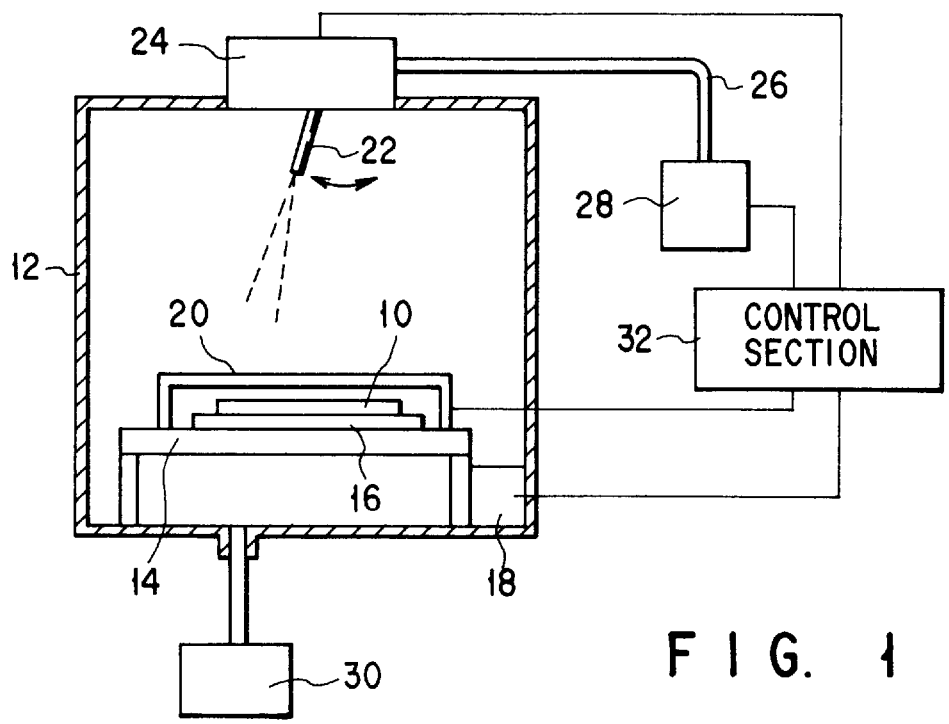
Figure 2:
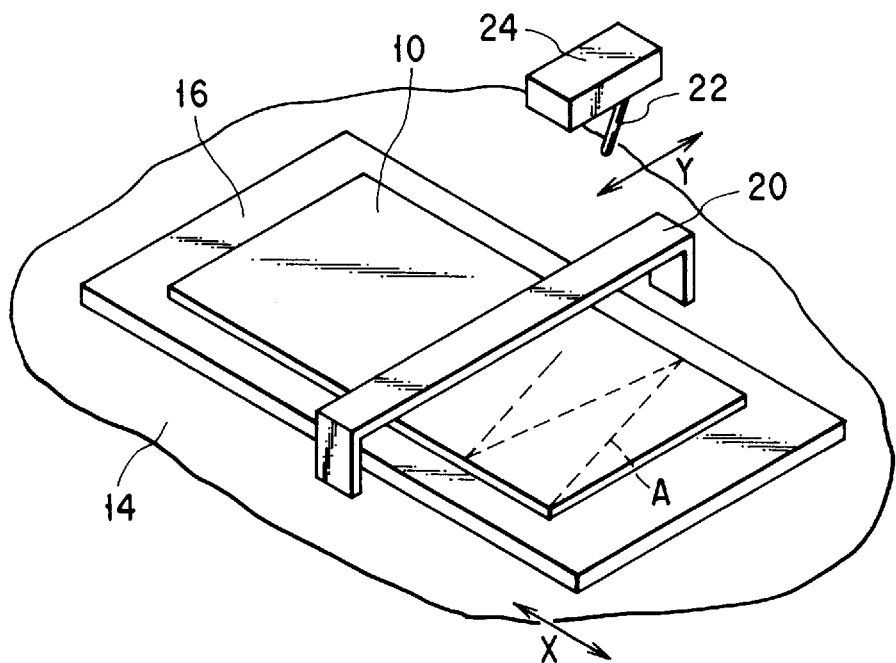
Figure 3:
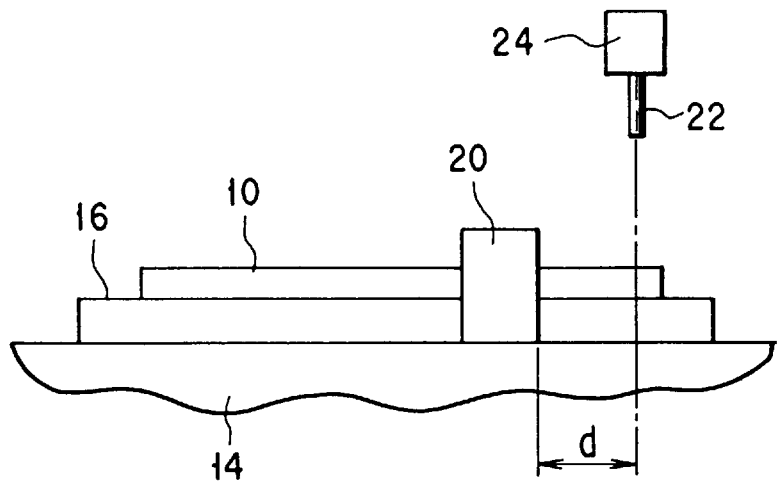

FIGS. 1 to 3 show a spreading apparatus for spreading particles serving as spacers onto a glass substrate 10 used for manufacturing liquid crystal display panels.

Figure 4:
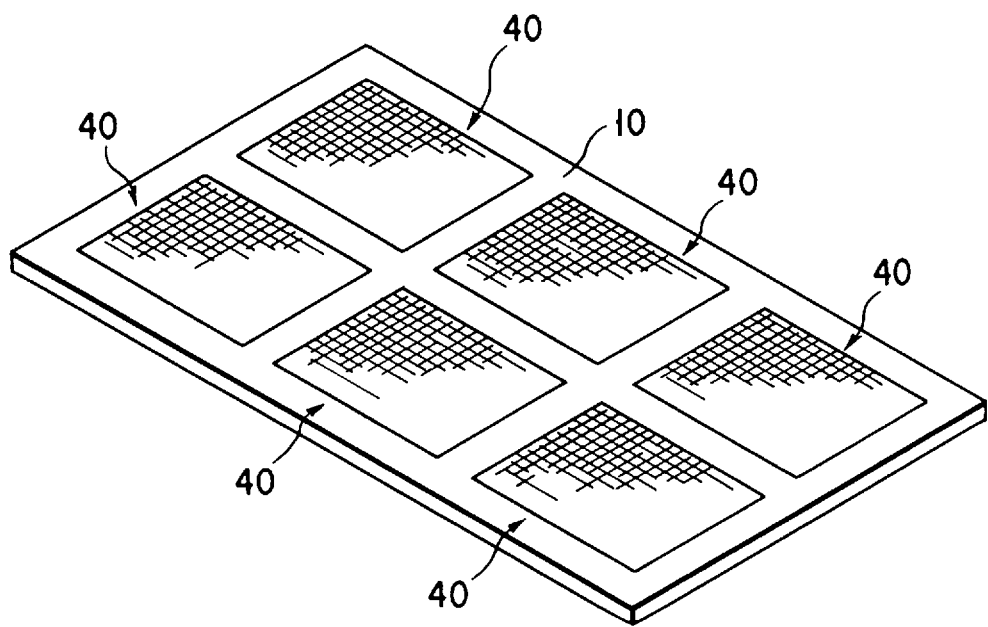
FIG. 4 is a perspective view of a glass substrate used for manufacturing array substrates of liquid crystal display panels.

As shown in FIG. 4, the glass substrate 10 formed in a rectangular shape and has a size corresponding to six array substrates used for liquid crystal display panels. Six conductive patterns 40 for the array substrates are formed on the surface of the glass substrate 10 with predetermined intervals.

As shown in FIG. 5, each of the conductive pattern 40 includes a number of signal lines 42 and a number of scanning lines 44 which are arranged in matrix and serve as conductive lines. A pixel electrode 46 is arranged in each region enclosed by the signal and scanning lines 42 and 44 and is connected to these lines through a thin film transistor 45. Further, the conductive pattern 40 has a rectangular short ring 48 to which the signal and scanning lines 42 and 44 are connected. On the glass substrate 10, a sealing agent 50 is pasted so as to surround each of the conductive patterns 40.

As shown in FIGS. 1 to 3, the spreading apparatus includes a container 12 which defines a spreading space for spreading spacers, partitioned from the outside, and a support base 14 provided in the container 12. A movable table 16 for mounting the glass substrate 10 is arranged on the support base 14, such that the table is movable in a X-direction parallel to a longitudinal side of the glass substrate 10. The movable table 16 is moved at a predetermined speed by means of a moving mechanism 18 having a motor (not shown), a transmission mechanism and the like. The movable table 16 is connected to the ground of the spreading apparatus.

In addition, a discharging bar 20 extending in a Y-direction perpendicular to the X-direction is provided on the support base 14 such that the bar 20 is located over the movable table 16 and faces parallel with the surface of the glass substrate 10 on the table 16.

In the container 12, a swingable spreading nozzle 22 is provided above the movable table 16. The spreading nozzle 22 is driven to swing at a desired angle and an arbitrary angle speed in the Y-direction by a nozzle drive mechanism 24 provided on the container 12. Further, the spreading nozzle 22 is disposed to shift in the moving direction (or X-direction) of the movable table 16 with respect to the discharging bar 20. The distance d between the spreading nozzle 22 and the discharging bar 20 in the X-direction is set to be shorter than the length of the glass substrate 10 in the X-direction and to be also as short as possible without causing the discharging bar 20 to interfere with the spreading operation. Specifically, the spreading nozzle 22 and the discharging bar 20 are arranged such that both of the spreading nozzle 22 and the discharging bar 20 are at least temporarily opposed to the glass substrate 10 while the glass substrate 10 is moved in the X-direction by the movable table 16.

Note that the movable table 16, the moving mechanism 18, and the drive mechanism 24 constitute a moving means in the present invention.

The spreading nozzle 22 is connected through a feed tube 26 to a feed device 28 for supplying particles. The feed device 28 comprises a spacer storage portion, a compressor also not shown, a shut-off valve, and the like (not shown). The spacer storage portion contains spacers consisting of resin balls each having a diameter of about 5 $\mu$m. The compressor supplies the spacers from the spacer storage portion to the spreading nozzle 22 through the feed tube 26 by air pressure and spreads the spacers from the spreading nozzle 20. In addition, a blower 30 for exhausting air in the container 12 is connected to the bottom portion of the container 12.

Each of the moving mechanism 28, the discharging bar 20, the nozzle drive mechanism 24, and the feed device 28 is connected to a control section 32 serving as control means. The operation of these components is controlled by the control section 32. For example, the nozzle drive mechanism 24 is capable of changing the swing angle and the angle speed of the spreading nozzle 22 under the control by the control section 32. Further, the feed device 28 is capable of arbitrarily setting the supply amount of the spacers per unit time, also under the control by the control section 32.

Next will be explained a method of spreading spacers onto the surface of the array substrate 10 by means of the spreading apparatus constructed as described above.

At first, a glass substrate 10 is placed on a movable table 16, with the lengthwise axis or the longitudinal sides of the glass substrate 10 oriented in the X-direction. The glass substrate 10 is conducted to the ground of the spreading apparatus through the movable table 16. Subsequently, under the control by the control section 32, the movable table 16 is moved in the X-direction at a predetermined constant speed by the moving mechanism 18, and the spreading nozzle 22 is made swing in the Y-direction at a predetermined angle speed.

In this manner, the glass substrate 10 on the movable table 16 moves in the X-direction from one end side of the substrate 10, passing below the discharging bar 20 and below the spreading nozzle 22. The glass substrate 10 and the spreading nozzle 22 move in relation to each other in the X- and Y-directions in a horizontal plane. Therefore, as shown in FIGS. 2 and 6, an extended line of the center axis of the spreading nozzle 22 moves drawing a saw-tooth-like zigzag trace A on the surface of the glass substrate 10. Note that the swing angle of the spreading nozzle 22 is set such that each of folded portions B of the trace A substantially corresponds with either of both side edges of the glass substrate 10.

Meanwhile, in synchronization with driving of the nozzle drive mechanism 24 and the moving mechanism 18, the discharging bar 20 is energized under the control of the control section 32, and simultaneously, the feed device 28 and the blower 30 are driven.

In this manner, as the glass substrate 10 passes below the discharging bar 20, the region of the glass substrate 10 which has faced the discharging bar 20 is sequentially discharged.

The spacers supplied from the spreading nozzle 22 are charged to a potential of about −5 to 10 kV by frictional charging or the like when they pass through the feed tube 26 and the spreading nozzle 22. Thus, the conductive patterns 40 on the glass substrate 10 are charged to a potential by the supplied spacers when discharging is not performed. By discharging the glass substrate 10 by means of the discharging bar 20, the potential of each conductive pattern 40 is discharged to a potential of substantially zero which is substantially lower than the charge of the spacers.

Further, the spacers are supplied to the spreading nozzle 22 through the feed tube 26 from the feed device 28 and are spread toward the surface of the glass substrate 10 from the spreading nozzle 22. Here, the spacers are spread with a predetermined width along the trace A of the spreading nozzle 22, onto that region of the glass substrate 10 which has been subjected to discharging by the discharging bar 20.

In addition, upon spreading the spacers, the control section 32 changes the spreading amount of the spacers in correspondence with the moving position of the spreading nozzle 22. Specifically, when the spreading nozzle 22 passes each of folded portions B of the trace A, e.g., when the spreading nozzle 22 passes the region outside each of circle marks in FIG. 6, the control section 32 reduces the supply amount of the spacers from the feed device 28 to a predetermined amount. Supposing that the spacer supply amount which will achieve a normal spread density of 150 particles/$mm^2$ is expressed as an index of 100, the spacer supply amount is reduced to an index of 50 to 70 when the nozzle 22 passes through each of the folded portions B.

For example, when the size of the glass substrate 10 is set to 550×650 mm, the angle speed of the spreading nozzle 22 is 15 rpm, and the swing angle is 60 degrees.

According to the spreading apparatus and the spreading method as constructed above, during the steps of spreading spacers from the spreading nozzle 22 while relatively moving the nozzle with respect to the glass substrate 10 so as to draw the zigzag trace A on the surface of the glass substrate 10, the spreading amount of the spacers spread from the spreading nozzle 22 is decreased at the folded portions of the trace, i.e., at the portions where the distance between parts of the trace including a folded portion is small. Therefore, the spreading density in the region where the distance between those parts of the trace is small is not higher than the other parts of the trace, thereby spreading the spacers with a uniform density over the entire surface of the glass substrate 10.

In addition, it is not necessary to position folded portions B of the trace A outside the glass substrate 10, thereby reducing the amount of spacers consumed from to ½ to ⅔ in comparison with the amount of spacers consumed when the spacers are continuously spread at a constant rate. Thus, the present invention improves economical efficiency.

Further, since the spacers are spread while discharging the glass substrate 10 by means of the discharging bar 20, the potential of the conductive patterns 40 in the region which is continuous to the spread region on the glass substrate and in which the spacers are not yet spread, is prevented from being charged to a potential equal to the spacers to be spread on the glass substrate. Therefore, spacers can be smoothly spread onto the region which has been discharged to a potential different to the potential of the spacers, i.e., discharged to the ground, so that the spread spacers are prevented from being repelled and scattered by the conductive patterns 40. As a result, it is possible to prevent non-uniform spreading of spacers, and spacers can be spread at a uniform spread density over the entire area of the glass substrate 10.

In addition, since the glass substrate 10 charged by the spread spacers is immediately subjected to discharging by the discharging bar, electric charges are not stored in the glass substrate, thereby preventing switching elements and the like in the conductive patterns 40 from being electrostatically broken down.

From the above, according to the spreading apparatus and the spreading method of the present embodiment, spacers are uniformly spread on an glass substrate. With use of this glass substrate, it is possible to provide liquid crystal display panels with high quality in which the distance between two substrates is uniform over the entire substrates.

Note that the present invention is not limited to the embodiment as described above, but can be variously modified within the scope of the invention.

For example, the above-mentioned embodiment is arranged such that the supply amount of the spacers from the spreading nozzle is reduced when the trace of the spreading nozzle passes each of folded portions of the trace. However, the supply amount of the spacers from the spreading nozzle may be continuously maintained at a constant value, and the moving speed or the angle speed of the spreading nozzle may be increased by about 15% when the spreading nozzle passes each of the folded portions of the trace. In this case, the spread amount of the spacers per unit area of the glass substrate can be reduced at each of the folded portions of the trace, and the spacers can also be uniformly spread as in the embodiment described above.

Further, the discharging means may be a soft X-ray ionizer rather than a discharging bar. In this case, the soft X-ray ionizer is capable of easily controlling the discharging area of the glass substrate, by shielding X-rays at portions where X-rays are not necessary. Besides, the air flow is not disturbed when the glass substrate is discharged by the soft X-ray ionizer. Therefore, regions of the glass substrate where spacers have yet to be spread can be subjected to discharging without influencing the on going spreading of the spacers.

As has been specified above, according to the present invention, spacer particles can be uniformly spread onto a substrate so that it is possible to provide a spreading method and a spreading apparatus which are capable of easily manufacturing a liquid crystal display element with high display quality and high reliability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A method of spreading spacing particles on a surface of a substrate used to form a liquid crystal display panel, the method comprising the steps of:

relatively moving said substrate and a spreading nozzle adapted to spread said spacing particles on said substrate with respect to one another as said spreading nozzle spreads said spacing particles such that said spacing particles spread from said spreading nozzle form a predetermined trace on said surface of said substrate; and discharging electric charge on said substrate while relatively moving said substrate and said spreading nozzle with respect to one another such that said spreading nozzle spreads said spacing particles on a discharged portion of said surface of said substrate.

2. A method of spreading particles according to claim 1, wherein said spreading nozzle spreads said spreading particles at a spreading rate which is controlled in relation to a relative position of said substrate with respect to said spreading nozzle.

3. A method of spreading particles according to claim 1, wherein said substrate and said spreading nozzle are relatively moved with respect to one another at a relative moving speed which is controlled in relation to a relative position of said substrate with respect to said spreading nozzle.

4. A method of spreading particles according to claim 1, wherein folded portions of said trace comprise two segments of said trace intersecting at an angle and said spreading nozzle spreads said spacing particles at a spreading rate, said spreading rate being reduced when said spreading nozzle is spreading said spacing particles at each of the folded portions of said trace.

5. A method of spreading particles according to claim 1 wherein said predetermined trace is a zigzag trace.

6. A method of spreading particles according to claim 4 wherein said predetermined trace is a zigzag trace.

7. A method of spreading particles according to claim 5, wherein said surface of said substrate has a pair of opposing side edges and folded portions of the zigzag trace are located adjacent said side edges.

8. A method for spreading spacing particles according to claim 1 wherein said discharging step includes relatively moving said substrate and a discharging device with respect to one another in a direction substantially parallel with a side edge of said substrate.

* * * * *